Sept. 9, 1930.  H. OSTROVSKY  1,775,472
ATTACHMENT FOR STRINGED MUSICAL INSTRUMENTS
Filed Feb. 15, 1928
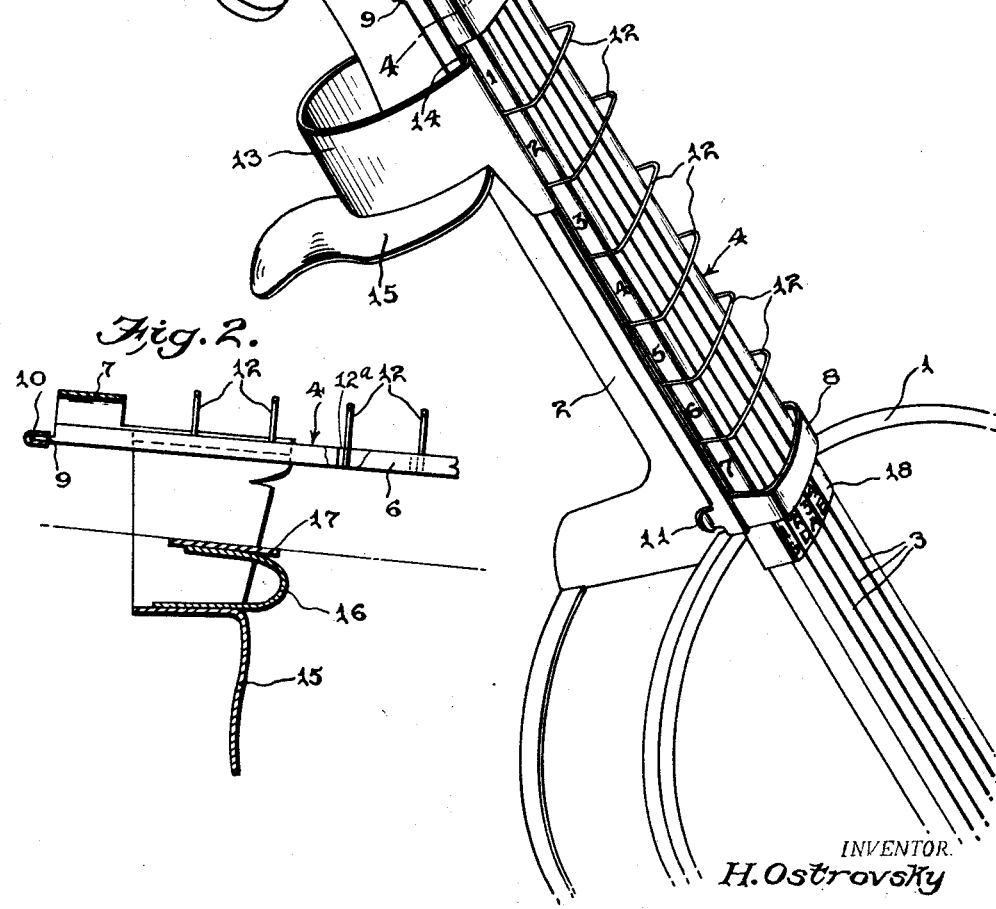
INVENTOR.
H. Ostrovsky
BY George A. Prevost
ATTORNEY.

Patented Sept. 9, 1930

1,775,472

UNITED STATES PATENT OFFICE

HARRY OSTROVSKY, OF BRYN ATHYN, PENNSYLVANIA

ATTACHMENT FOR STRINGED MUSICAL INSTRUMENTS

Application filed February 15, 1928. Serial No. 254,403.

My invention consists in new and useful improvements in guide attachments for violins, cellos and similar stringed instruments, and has for its object to provide a device which may be removably secured to a violin or the like for training a student to find the exact finger location on the finger board, and assist him in the proper positioning of his thumb and wrist when holding a violin and for testing and correcting intonation difficulties in the case of advanced players.

A further object of my invention is to provide a device which will not only retain the fingers in the proper location on the board, but the hand and thumb in the proper position with respect to the strings.

A still further object is to avoid the necessity of a student relying upon his ear for a correct note, by locating his fingers on the finger board.

Another object is to provide an indicating strip adapted to be inserted beneath the strings on the finger board, and provided with numbers for indicating the spaces and numbers or letters, or both for indicating the strings.

Still another object of my invention is to provide a guide having cross wires which are capable of being flexed in one direction only, namely toward the head of the instrument.

With the above and other objects in view which will appear as the description proceeds, my invention consists in the novel features herein set forth, illustrated in the accompanying drawings and more particularly pointed out in the appended claims.

Referring now to the drawings, in which numerals of like character designate similar parts throughout the several views, Fig. 1 is a perspective view of a violin with my improved finger guide attached thereto.

Fig. 2 is a longitudinal sectional view of the guide itself.

Fig. 3 is a plan view of the guide, and

Fig. 4 is a sectional view taken on line 4—4 of Fig. 1 showing my improved clamping means.

In the drawings, 1 represents a violin having the conventional neck or finger board 2, supporting the usual series of strings 3. 4 represents my improved finger guide adapted to be removably secured to the finger board 2 of the violin and consisting of a frame composed of two longitudinally extending channels 5 and 6, secured together at their extremities by cross plates or strips 7 and 8, of resilient material. These channels 5 and 6 are inclined toward one another at the tuning end of the finger board 2, to conform substantially to the shape of the finger board of a violin, as shown in Fig. 3, and are provided with horizontal lugs 9, integral with the tuning end thereof, said lugs being adapted to engage a cross channel 10, hereinafter referred to more in detail.

The opposite ends of said channels 5 and 6 are provided with resilient spring clips 11, on their under edge, and inwardly projecting horizontal lugs 11ª on the inner surface thereof, adapted to engage and grip the finger board 2 of said violin to retain said guide in place thereon. 12 represents a plurality of substantially inverted U-shaped or arched cross wires, the opposite ends of which are secured in the recesses of the respective channels 5 and 6, at predetermined points throughout their length, as clearly shown in the drawings. These cross wires 12 are permanently secured to said channels in such a manner that they may be flexed slightly in the direction of the head of the violin, but not in the opposite direction. One manner in which this condition may be effected, is to provide abutments or stops 12ª in the channels 5 and 6 adjacent the sides of the cross wires 12 disposed away from the head of the instrument, as shown in Fig. 2, whereby flexing of said wires in the latter direction is prevented.

13 designates a hand and thumb guard which consists of a U-shaped strip of suitable material, preferably resilient, its upper edges being bent inwardly and downwardly to form hooks 14 adapted to engage the recesses in the longitudinal channels 5 and 6, said hook portions being cut out to accommodate the cross wires 12, at those points where the two engage one another. One of the vertical edges of the member 13 is bent outwardly to form a laterally projecting flange 15 which extends downwardly to a predetermined point below the lower extremity of said member 13, otherwise secured to the inner surface on the lower extremity of the thumb guide 13, the upper end of said spring strip supporting the concave plate 17, adapted to be forced against the under face of the finger board 2 of the violin, to retain said thumb guide in place together with the tuning end of the finger guide 4.

An indicating strip 18 is adapted to be inserted beneath the strings 3, on the finger board 2, and is embellished with suitable indicia for designating the strings and spaces. As shown in Fig. 1, this strip 18 is shaped to fit the upper surface and edges of the finger board, and is provided longitudinally along one edge with a series of numerals for indicating the spaces, and at the bridge end with numerals or letters for indicating the strings, which latter numerals or letters are preferably of different colors. For instance, the G or 1st string is black, the D or 2nd string green, the A or 3rd string red, and the E or 4th string blue. If desired the string indicia may be located on the cross strip 8.

The strip may be retained in place by the frame of the guide, or any other suitable means.

Having thus described the construction of my improved finger guide, the application and use of the same are as follows:—

The indicating strip 18 is inserted beneath the strings 3, and the cross channel strip 10 is placed in position at the tuning end, also beneath the strings 3. The finger guide 4 is then secured in place by inserting the lugs 9 in the channel of said cross member 10, and snapping the spring clips 11 and lugs 11ª in place. The hooked edges 14 of the thumb guide 13, are then inserted in the recesses of the channels 5 and 6, said guide being retained in this position by the spring and concave plate 16 and 17 respectively.

It will thus be seen that when the player grips the violin neck, his thumb, hand and wrist will be held in the proper position by the member 13, while his fingers are directed to the proper location on the finger board, by the indicia on the indicating strip 18, said fingers being prevented from displacement and striking the wrong space, by the cross wires 12. As before stated, the cross wires 12 may be flexed in one direction to aid the player in the proper placement of his fingers.

I have found it desirable, in order to simplify the use of my improved finger guide, to employ a novel form of notation which instead of the usual five line stave, comprises the designation of the particular string and space by the number of the space printed on the sheet in the color of the desired string, the value of the note being designated in the usual manner. For instance, my notation will appear thus:—

(green) (red) (blue) (black)
5 1 3 2

When reading this notation, it will be obvious to the player that he is first to finger the D string at the 5th space for the required beat, then the A string at the 1st space, the E string at the 3rd space and the G string at the 2nd space.

My improved construction relieves the mind of a student in obviating the necessity of reading the usual notation of the five line stave, key, flats and sharps, requiring only the use of numbers for spaces and colored numbers or letters for the strings.

From the foregoing it is believed that my invention may be readily understood by those skilled in the art without further description, it being borne in mind that numerous changes may be made in the details disclosed without departing from the spirit of the invention, as expressed in the following claims.

What I claim and desire to secure by Letters Patent is:

1. An attachment for stringed musical instruments, comprising a laterally flexible resilient frame, a plurality of transverse arched cross wires supported in said frame, means for removably securing said frame to the neck of a stringed instrument, and a thumb and wrist positioner removably secured to said frame and neck.

2. An attachment as claimed in claim 1, wherein said frame comprises two longitudinally extending strips secured together at each end by resilient arched cross strips, one end of said first named strips being provided with lugs for engaging a cross bar, and at the other end with lugs and spring clips for gripping the neck of the instrument.

3. An attachment for stringed musical instruments, including a frame consisting of two longitudinally extending channel strips secured together at each end by resilient arched cross strips, the head end of said channel strips being provided with lugs and spring clips for gripping the neck of the instrument, the opposite end of said channel strips having longitudinally projecting horizontally disposed lugs, a grooved cross bar held in place by the strings of said instrument and adapted to be engaged by said lugs, a plurality of transverse arched cross wires secured in the channels of said channel strips at predetermined points, and a thumb and wrist positioner removably secured to said frame and the neck of said instrument.

4. An attachment as claimed in claim 3, wherein said thumb and wrist positioner comprises a U-shaped band of resilient material, bent inwardly and downwardly at its ends to engage the channels of said channel strips, and provided on the inner surface at its lower extremity with a spring pressed plate adapted to engage the under surface of the neck of the instrument, said band being provided along one of its edges with an extension shaped to fit the palm of the player's hand.

In testimony whereof I affix my signature.

HARRY OSTROVSKY.